Patented June 6, 1950

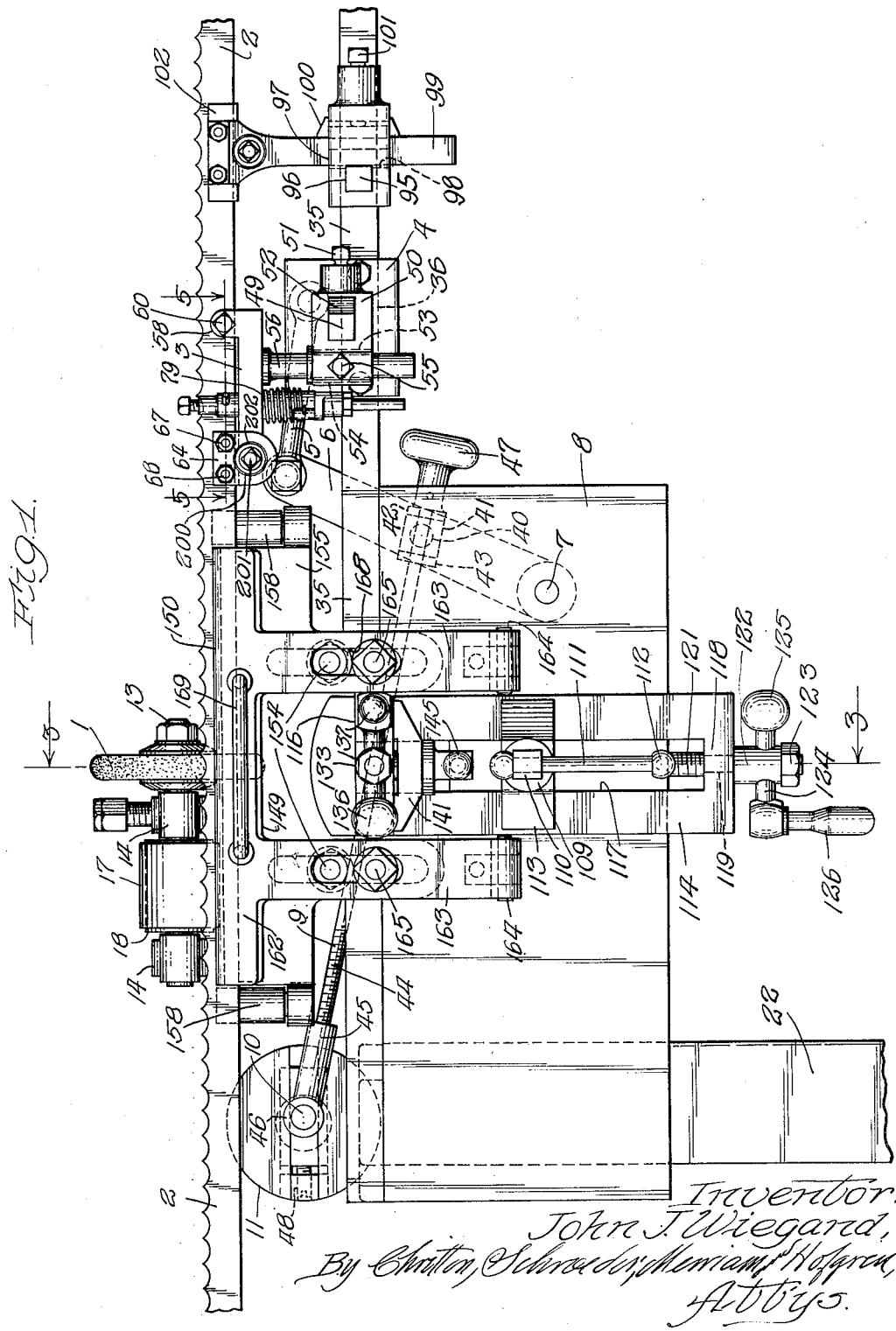

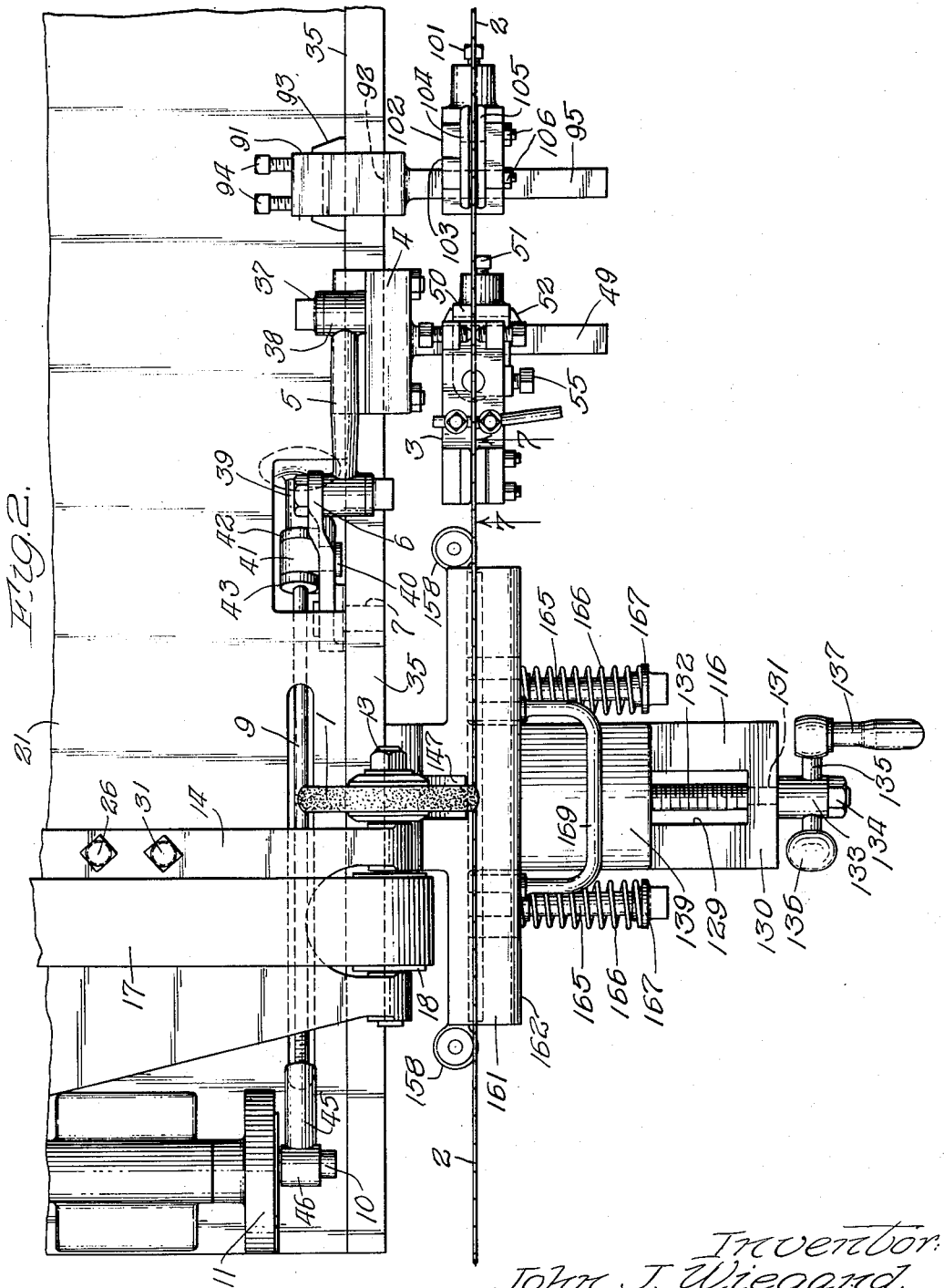

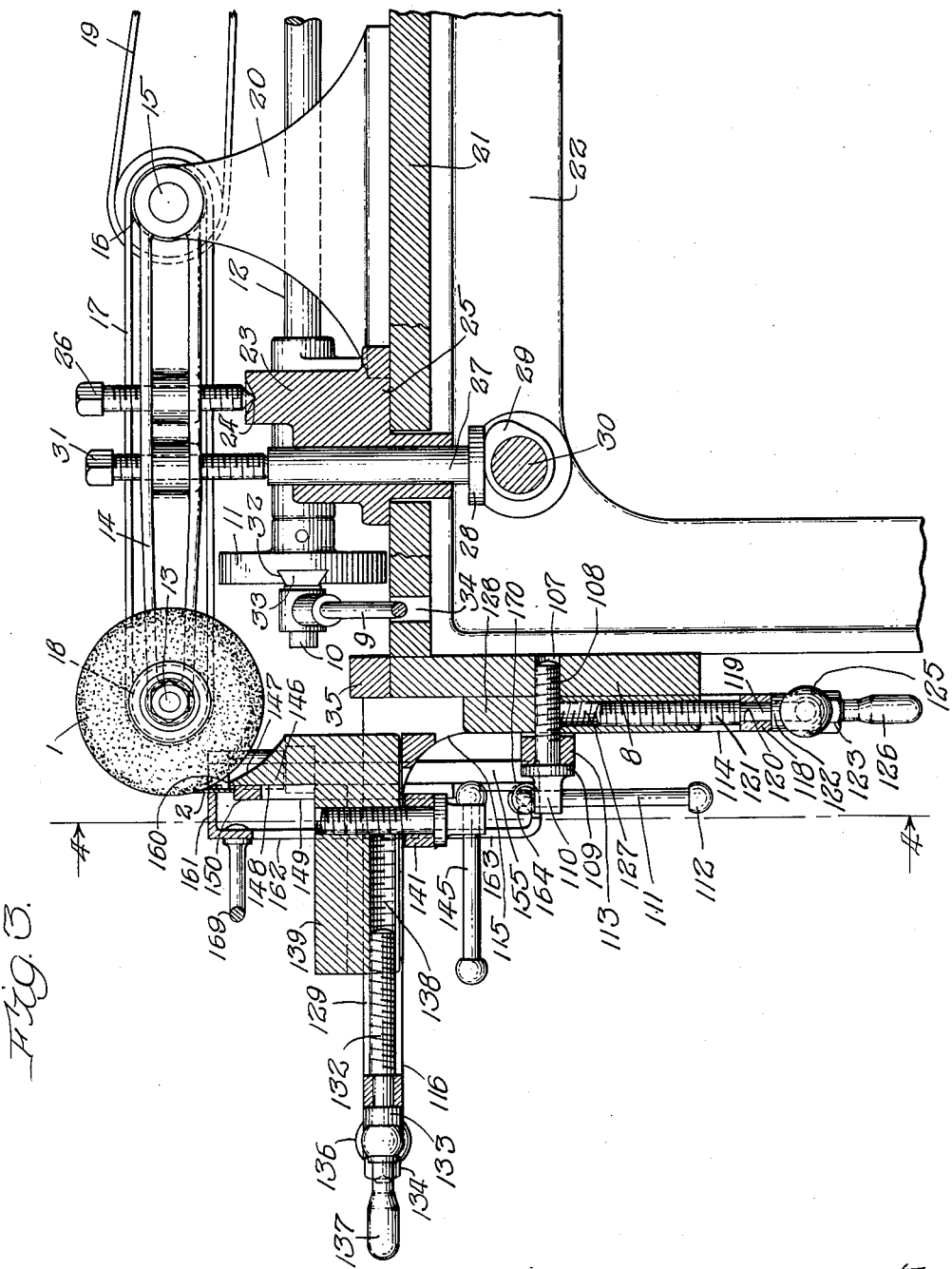

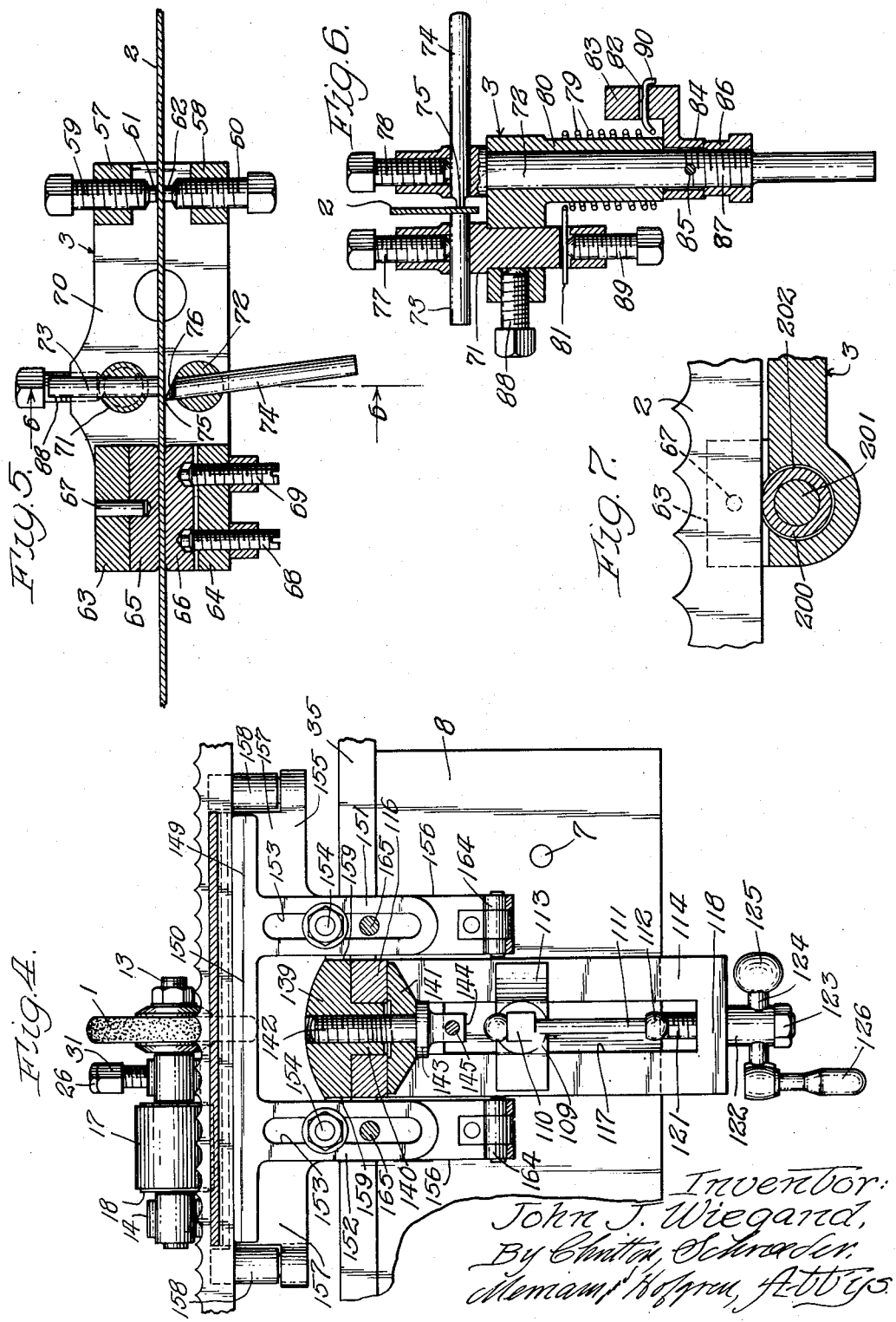

2,510,301

UNITED STATES PATENT OFFICE 2,510,301

CUTTING APPARATUS FOR MAKING STEPPED CUTS

John J. Wiegand, Chicago, Ill.

Application November 1, 1947, Serial No. 783,473

18 Claims. (Cl. 51—72)

This invention relates to apparatus for performing cuts upon the stock being operated upon, at stepped intervals along said stock, and in a more specific application of the invention it embodies the formation of, and the sharpening of, saw teeth.

In the making, as well as sharpening of saws, and especially band saws for the cutting of paper, cardboard, leather and other materials, much expense has been entailed because of the large amount of labor involved as a result of such teeth being cut and sharpened by hand. In the present invention I have eliminated this large expenditure of time and have provided an apparatus in which the teeth in the saw can be originally cut, and can also be sharpened when the saw becomes dulled, automatically by merely placing the saw in the machine of the present invention and advancing the saw in steps of any desired distance between the teeth of the saw when the machine is operated. This stepped operation can be continued as long as desired so as to form, or sharpen, the teeth in a circular band saw, or in a straight saw, as desired.

Among the objects of my invention are: to provide a novel and improved cutting apparatus for making cuts at stepped intervals in the stock being operated upon; to provide an improved apparatus for making stepped cuts in a saw blade and the like; to provide a cutting apparatus in which the cutting tool is moved away from the stock being operated upon after the cut is finished and at the same time the stock will be automatically moved past the cutting tool to a new position for the next succeeding cut; to provide cutting apparatus having an improved carriage automatically operated in stepped operations for moving the stock past the cutter for bringing the stock into position for a new cut; to provide a saw grinding apparatus having a grinding wheel adapted to grind teeth in a saw blade, and a carriage having novel means for advancing the saw blade longitudinally after each cut to bring it into position for the next cut; to provide novel means for mounting a saw blade in apparatus for cutting teeth therein, and novel means for advancing the saw blade with relation to the cutter; and such further objects, advantages and capabilities, inherently possessed by my invention, as will later more fully appear.

My invention further resides in the combination, construction and arrangement of parts illustrated in the accompanying drawings, and while I have shown therein for illustrative purposes a preferred embodiment I wish it understood that the same is susceptible of modification and change without departing from the spirit of my invention.

In the drawings:

Fig. 1 is a front elevation of the essential parts of a cutting apparatus embodying my invention.

Fig. 2 is a top plan view of Fig. 1.

Fig. 3 is a vertical transverse section on the line 3—3 of Fig. 1.

Fig. 4 is a vertical longitudinal section on the line 4—4 of Fig. 3.

Fig. 5 is an enlarged horizontal longitudinal section on the line 5—5 of Fig. 1.

Fig. 6 is a vertical transverse section on the line 6—6 of Fig. 5.

Fig. 7 is an enlarged longitudinal section on the line 7—7 of Fig. 2.

In the form shown in the drawings for illustrative purposes, my invention is illustrated for application in sharpening the teeth of a saw blade which is preferably used for cutting paper, cardboard, leather or other materials to which the saw is adapted. When used for sharpening an already formed saw, the teeth will be ground by a grinding wheel and the grinding wheel then moved away from the saw blade and the saw will be moved one step forwardly a distance equal to the distance between two of the teeth, for making the next cut. This forward stepping action is accomplished by a novel form of carriage and operating mechanism, later more fully described. When the saw has been ground between each two teeth on one side for the length of the saw, it will be turned around end for end and the teeth correspondingly ground on the other side in a similar manner to form sharpened teeth to perform the cutting operation when the saw is in use. When applied to a band saw, after all of the teeth have been sharpened on one side, the band saw will be removed from the device and turned around end for end and the teeth sharpened on the other side.

My apparatus, as illustrated in the drawing, comprises generally a grinding wheel 1 adapted to be moved to and away from the saw blade 2, a carriage 3 fixed to a cross head 4 which is longitudinally reciprocated by means of a link 5 pivotally connected to the upper end of a lever 6 fulcrumed at its lower end at 7 to an apron 8 of the machine frame, said lever 6 being oscillated by the connecting rod 9 reciprocated by the crank pin 10 of a crank disk 11 rotatably mounted upon a shaft 12 rotated by suitable mechanism (not shown) in the machine. The grinding wheel 1 is rotatably mounted upon a shaft 13 supported upon the outer end of an arm 14 swingingly fulcrumed at its rear end to a short shaft 15 carrying a pulley 16 over which runs a belt 17 which in turn passes over a pulley 18 mounted upon shaft 13. Pulley 18 is driven by a belt 19 receiving its power from mechanism (not shown) in the machine.

Shaft 15 is mounted at the upper end of one or more upstanding pedestals 20 mounted upon the top plate 21 of the frame 22 of the machine. Shaft 12 is rotatably mounted in any suitable bearing mounted on the upper surface of the top plate. Also mounted on the top plate and directly below the arm 14 is an upstanding block 23 which has an upwardly extending boss having a depression 24 within which is rotatably seated the lower end of an adjusting screw 26 threadably mounted in the grinding-wheel-supporting-arm 14. Rotation of screw 26 in the appropriate direction will determine the extent to which wheel supporting arm 14 may be lowered with relation to the saw blade 2. This forms an adjustable stop by which the limit of downward movement of the grinding wheel 1 may be selectively determined.

Also slidably mounted in block 23 is a rod 27 having at its lower end a head 28 against which wipes a cam 29 fixed to rotate with shaft 30 rotated by any suitable mechanism in the machine, so that the raised portion of cam 29 will intermittently elevate rod 27 each time that said raised portion passes under head 28. Contacting the upper end of rod 27 is a bottom end of a screw member 31 threadably mounted in wheel arm 14. It is thus seen that by suitably adjusting the adjusting screws 31 and 26 the extent to which the grinding wheel 1 may be lowered is controlled. As will be understood when the raised portion of cam 29 has passed beyond the face of head 28, gravity will return the grinding wheel, its supporting arm and associated parts to their lowered position.

Fixed to the outer end of shaft 12 is the crank disk 11 in the outer face of which is formed a diametrically positioned dove-tail slot 32 in which is slidably mounted the correspondingly shaped end 33 of the crank pin 10. This adjustment of crank pin 10 as will be readily understood can be made to give any desired degree of eccentricity to the crank pin to in turn control the amount of longitudinal reciprocation of cross head 4 through link 5, lever 6 and connecting rod 9 as will be readily understood in Fig. 1. Cross head 4 is longitudinally slidable on guide rod 35 preferably square or rectangular in cross section and rigidly mounted on apron 8 to extend therefrom and parallel thereto.

Extending laterally from cross head 4 is a pin having a flange 37 upon which pin is rotatably mounted the end 38 of link 5. The opposite end of link 5 is rotatably mounted upon the stub shaft 39 mounted in the upper end of lever 6. Mounted upon an intermediate portion of lever 6 is a fulcrum pin 40 carrying a longitudinally bored bearing 41 through which bore extends the connecting rod 9.

Fixed to connecting rod 9 and positioned one upon each of the end faces of the bearing member 41 is a pair of collars 42 and 43 so that longitudinal movement of the connecting rod will transmit an oscillating movement to the lever 6 which through link 5 will longitudinally reciprocate cross head 4 on the guide rod 35. Connecting rod 9 is threaded for a substantial distance at its end adjacent the crank pin 10 at 44, which threads engage a threaded opening in sleeve 45 fixed to the bearing 46 within which the crank pin 10 is rotatable.

It is thus seen that rotation of connecting rod 9 by means of the handle 47 (which is fixed to the end of rod 9) will cause threads 44 to move inwardly or outwardly in the threaded opening in sleeve 45 and thus change the angularity of lever 6 to accommodate various positions of longitudinal reciprocation of cross head 4 on guide rod 35. The longitudinal extent of reciprocation of cross head 4 can be adjusted by moving the dove-tail end 33 of crank pin 10 any desired amount in either direction along slot 32 in crank disk 11 by rotation of adjusting screw 48 as seen in Fig. 1.

As seen in Fig. 2 cross head 4 is provided with a laterally extending arm 49 preferably non-circular in cross section, upon which is slidably mounted for adjustment toward or away from cross head 4 a head 50 (see Fig. 1) which is fixed in any one of many adjusted positions on arm 49 by means of set screw 51 clamping the notched shim 52 against arm 49. Head 50 is formed at its left hand end as viewed in Fig. 1 with a vertically extending opening 53 within which is mounted a slotted sleeve 54 which may be clamped by screw 55 to fixedly mount the rod 56 in head 50 and yet permit rod 56 to be rotatably adjusted and fixed in such adjusted position with relation to the head 50.

Mounted upon the upper end of rod or stem 56 is the carriage 3 which by any suitable means such as a set screw or the like may be fixed in any desired angular position with relation to the stem 56. One end of the carriage 3 is provided with a pair of laterally spaced upstanding ears 57 and 58 threadably receiving a pair of adjusting screws 59 and 60. The inner end of each of these adjusting screws is somewhat reduced in diameter to form the normally spaced apart ends 61 and 62 for providing therebetween a space sufficiently great in width to permit the saw blade 2 to freely slide therebetween without any undue side action or buckling of the saw blade.

The opposite end of the carriage is provided with a pair of upstanding ears 63 and 64 which are preferably greater in length than ears 57 and 58. Ears 63 and 64 are laterally spaced apart a substantial distance to receive therebetween the two adjusting blocks 65 and 66. Block 65 is held against longitudinal sliding movement by pin 67 with sufficient looseness to permit removal of block 65 from this pin longitudinally of the pin when desired for assembly and other purposes. Block 66 is provided with a pair of longitudinally spaced recesses to receive the ends of adjusting screws 68 and 69 by means of which, block 66 may be adjusted toward and away from block 65 to enable the formation of a space between these blocks slightly greater than the thickness of the saw blade to permit the saw blade to slide longitudinally therein. As seen in Fig. 7 a roller, in the form of a sleeve 200 rotatably mounted on a screw bolt 201 screwed into the closed end of opening 202, is positioned to be slightly exposed in the bottom of the space between blocks 65 and 66 to rollably support the saw blade as it passes through said space.

Rotatably mounted through the body portion 70 of carriage 3 are a pair of vertically extending rods 71 and 72, the former of which is provided with a laterally extending diametrical opening to receive the pin 73 therethrough and through the rod 72 is a diametrical opening to receive a gripping pin 74 which at its inner end is formed with a sharp edge 75 of reduced width as shown in Fig. 6. The end of pin 74 adjacent the saw blade is beveled or inclined at 76 so that when the gripping point 75 is in gripping contact with the side face of the saw blade it will be offset to the left, as viewed in Fig. 5, from the axial center line of pin 73. Pin 73 is fixed in rod 71 by means of a set screw 77 threadably mounted in rod 71 and bearing down against the upper surface of pin 73 as seen in Fig. 6. A similar set screw 78 is threadably mounted in the upper end of rod 72 to bear against pin 74 and hold it fixed in adjusted position in rod 72.

By adjustment of set screws 77 and 78 pins 73 and 74 may be adjusted longitudinally with relation to each other so as to provide a space between the ends thereof to accommodate a saw blade therebetween in such manner that the gripping end 75 of pin 74 will be in the position shown in Fig. 5. In other words this position is such that if the saw blade were not present between the ends of these pins, and pin 74 were swung into alinement with pin 73 the gripping point 75 would be nearer to the adjacent end of pin 73 than the thickness of the saw blade. This means that when a saw blade is positioned between adjusting screws 59 and 60 at one end of the carriage and between adjusting blocks 65 and 66 at the other end of the carriage, and between the ends of pin 73 and 74 in an operating position, the parts will be as shown in Fig. 5 with the gripping edge 75 in advance of the dead center position.

As seen in Fig. 6 a coil spring 79 is positioned around the downwardly extending sleeve 80 of carriage 3 the end 81 of which spring is gripped in an opening in the lower end of rod 71 and at its other end 82 passes through an upstanding lug 83 of a sleeve 84 fixed by pin 85 to rotate with rod 72. Sleeve 84 is further held in vertical position by a threaded sleeve 86 threadably engaging threads 87 of rod 72. The torsion and arrangement of coil spring 79 is such as to urge rod 72 to rotate in a clock-wise direction as viewed in Fig. 5 so as to continually cause the sharp edge 75 of pin 74 to tend to bite into a saw blade in one direction of movement of the carriage and to idly slide along the face of the saw blade when the carriage is moved in the opposite direction as will be understood in Fig. 5. Rod 71 may be gripped against rotational movement in the carriage by means of set screw 88. The end 81 of coil spring 79 is gripped in place by set screw 89, while the offset end 82 of this coil spring is formed with an angle bend 90 to prevent it being inadvertently moved from the upstanding lug 83.

Fixed to the guide rod 35 is a supporting block 91 having an opening 92 therethrough of larger cross-sectional area than that of the guide rod 35. Positioned in hole 92 is a notched shim 93 which is positioned as shown in Fig. 2 between guide rod 35 and the side of hole 92, and by clamping against the side face of the notched shim with a pair of set screws 94 will clamp block 91 firmly onto guide rod 35. Extending laterally from block 91 is an arm 95, preferably of square cross section, which slidably extends through a correspondingly shaped hole 96 formed in a second block 97 to permit the second block 97 to be slid to any desired adjusted position along arm 95. Extending vertically through second block 97 is a preferably rectangular hole 98 which at its adjacent portion overlaps a slight portion of one side of opening 96. Vertically extending preferably square arm 99 is extended through opening 98 and selectively held in vertical adjustment therein by a notched shim 100 and a set screw 101.

It is to be noted that when arm 99 is tightened in its desired vertical position by the tightening of set screw 101 the same pressure will also clamp the vertical arm 99 against the horizontal arm 95 and simultaneously clamp both of these arms fixedly in the second block 97.

The upper end of arm 99 is provided with an enlarged head 102 which has a longitudinally extending slot 103 formed in the upper face thereof to receive the gage blocks 104 and 105 which are laterally loose in slot 103; gage block 104 being held in place by any suitable means such as a pin (not shown) to permit lateral movement of said block but prevent longitudinal movement thereof. Gage block 105 is loosely held in place by a pair of screws 106 so that it may have a slight lateral movement but is fixed against longitudinal movement. A roller sleeve similar to that described in conection with Fig. 7, is also mounted in head 102 to be slightly exposed in the bottom of the space between blocks 104 and 105 to rollably support the saw as it passes therealong. Gage blocks 104 and 105 are thus positioned so as to slidably permit the saw blade to freely pass therebetween, the space between gage blocks 104 and 105 through which the saw blade slides being in longitudinal alinement with the three saw blades receiving spaces in the carriage shown in Fig. 5, so as to permit the saw blade to freely pass through all of said four spaces. This will guide the saw blade and prevent it from buckling or being otherwise forced out of alinement.

Apron 8 which is fixedly mounted in the machine frame is formed with a threaded opening 107 in which is threadably mounted a screw 108 having a collar 109 and a head 110 in which is slidably mounted a handle rod 111 which rod at each end is provided with an enlarged ball 112 to slidably retain handle rod 111 in the head 110. Loosely mounted on screw 108 is a clamping block 113 adapted to be clamped against the outer face of the downwardly extending leg 114 of an L-shaped metal member 115 which at its upper end integrally carries the outwardly extended horizontal arm 116. The downwardly extending leg 114 is formed with a slot 117 closed at its bottom end by the cross member 118 having a non-threaded opening 119 within which is rotatably mounted the neck 120 of the screw 121, neck 120 being of smaller diameter than the threaded portion of said screw. Neck 120 extends downwardly through a hub 122 which is pinned or fixed in any desired manner to the lower end portion of neck 120. The lower end of neck 120 will be threaded to receive a nut 123 adapted to be gripped against the lower face of hub 122. Extending laterally from both sides of hub 122 is a handle bar 124 fixed with relation to hub 122 and having at one end a ball 125 and at the other end a handle 126.

Screw 121 is threaded into a vertical threaded opening 127 formed in block 128 positioned in slot 117. Screw 108 also passes through block 128 to hold said block stationary and fixed with relation to apron 8. By loosening the handle rod 111 to slightly unscrew screw 108 the bottom leg 114 of the L-shaped member may be loosened with relation to block 128 and apron 8, and adjusted vertically up or down by rotating handle 126 and screw 121 in the appropriate direction to elevate or depress the L-shaped member as desired. When the desired position of adjustment has been reached handle rod 111 will then be rotated in a tightening direction to tighten screw 108 and clamp block 113 against the outer faces of the leg 114 on opposite sides of the slot 117.

The upper horizontally extending leg 116 of the L-shaped member 115 is formed with a slot 129 having a closed outer end 130 in which is rotatably mounted the neck 131 of screw 132, said neck 131 having pinned or otherwise fixed on its outer end a hub 133, the outer end of neck 131 extending beyond the outer face of hub 133 and being threaded to threadably receive the lock nut 134. Fixed to extend in both directions from hub 133 is a handle rod 135 having at one end a ball 136 and at the other end a handle member 137.

As seen in Fig. 3 screw 132 is threadably mounted in a threaded opening 138 in head block 139 having on its lower face a central downwardly extending rib 140 slidably seated in slot 129. Mounted below slot 129 to straddle the longitudinal members on both sides of said slot is a gripping block 141 through which is loosely mounted a screw 142 threadably mounted in a threaded opening in the head block 139. Fixed upon the lower end of screw 142 is a collar 143 having a downwardly extending head 144 having a handle rod 145 for rotation of this screw. Tightening or loosening screw 142 will enable adjustment of head block 139 along slot 129 and locking of the head block in desired adjusted position.

Head block 139 at its right end and as viewed in Fig. 3 has an upstanding portion 146 formed with an arcuate groove 147 to provide clearance for the grinding wheel 1. At its left hand side the upstanding portion 146 is formed with a flat face 148 to slidably receive the saw supporting member 149 having the upper horizontally extending bar 150 and two downwardly extending legs 151 and 152, each of which last mentioned legs is formed with a vertically extending slot 153 to be vertically slidable with relation to bolts 154. Bolts 154 are screwed or otherwise fixed at their inner end to the supporting plate 155. This plate has two spaced apart downwardly extending legs 156 and at each end of its top portion is formed with extending portions 157 each having rotatably mounted therein a roller 158 against which the adjacent side face of the saw blade has rolling contact. Supporting plate 155 is welded or otherwise suitably fixed at 159 at the inner edge of each of its downwardly extending legs 156 to the head block 139 so as to move therewith backwardly and forwardly along the laterally extending leg 116 so that when head block 139 is moved along said leg, supporting plate 155 will move therewith. Plate 150 may be adjusted upwardly and downwardly with relation to plate 155 by loosening and tightening the nuts on bolts 154 so as to raise or lower plate 150.

It is to be noted in Fig. 3 that the top edge of plate 150 forms a longitudinally extending flat upper surface to serve as a support for the bottom edge of the saw blade adjacent the grinding wheel. The top outer face of the top portion of plate 155 is formed with a pair of grooves 160 to reduce the bearing surface against which the adjacent face of the saw blades slides when forced inwardly by the inner edge of the angular top jaw 161 of the jaw plate 162 which is formed with two downwardly extending flat legs 163 each of which at its lower end carries a hinge member 164 so that said jaw plate may be swung laterally to move the angle jaw 161 away from or toward the saw blade. To normally urge the angle jaw 161 toward the saw blade to frictionally hold the saw blade against inadvertent rearward movement, I have provided, to extend through each of the flat legs 163, a rod 165 (one on each side as viewed in Fig. 2) each of these rods being encircled by a coil spring 166 which is compressed between a collar 167 on each of these rods and the outer face of the downwardly extending flat legs 163 of the jaw plate. The inner ends of bolts 165 pass through a slot 168 formed in each of these flat legs 163, so that when the jaw plate 162 is moved outwardly by a pull on the handle 169 said last mentioned slots will prevent binding of the rods 165 with relation to the jaw plate. After passing through slot 168 each of the rods 165 are fixed in any desired manner as by screwing, welding, or the like to the supporting plate 155. The hinge members 164 at the bottom end of legs 163 are rotatably connected to complemental hinge members 170 mounted upon the supporting plate 155.

The structure last described above enables the jaw plate 162 to be moved outwardly by a pull upon handle 169 against the compression of coil springs 166 to permit a saw blade to be inserted with its bottom edge resting upon the top 150 of supporting member 149 (see Fig. 3), whereby the saw blade may be gripped between the top edge of supporting plate 155 and the inner edge of the angle jaw 161. The coil springs 166 urge the angle jaw plate inwardly against the saw blade with sufficient force to positively hold the saw blade against rearward movement when the carriage 3 is moved to the right as viewed in Fig. 1, but yet permit the saw blade to slide forwardly when the carriage is moved in the opposite direction. This enables the carriage to move rearwardly for a new grip without moving the saw blades and then immediately when it starts forwardly the gripping edge 75 of the swingable pin 74 grips the saw and moves it forwardly (to the left as viewed in Fig. 1) a distance equal to one tooth being ground by the grinding wheel 1.

From the above structure it will be seen that a saw blade may be inserted in the machine and the grinding wheel 1 lowered automatically by shaft 30 to grind one tooth. By the time the cam 29 has rotated into position to engage head 28 of rod 27 the grinding of the tooth being operated upon will be completed and cam 29 will raise the grinding wheel away from the saw blade through arm 14. During this interval that the grinding wheel is being held away from the saw blade the carriage 3 through the medium of the swingable pin 74 and the abutting pin 73 will grip the saw and move it forwardly a distance of one tooth, which distance will be determined by proper adjustment of the parts as described above. When the new position has been reached the grinding wheel will be lowered to sharpen the next tooth and during this period the carriage 3 will be moving rearwardly (to the right as viewed in Fig. 1).

Upon completion of this rearward movement the carriage will be moved in the opposite direction and will grip the saw blade as described above and again move it forwardly a distance of one tooth. During this forward movement as explained above the grinding wheel will be elevated away from the saw blade. This sharpening or forming of the saw tooth will be continued for the entire length of the saw blade, which as stated earlier herein can be a band saw with the opposite leg positioned laterally to the rear of the grinding wheel. When all of the saw teeth have been ground or formed in the band saw, the saw will be removed by opening the angle jaw 161 and the saw turned end for end with its inoperative leg then positioned to the front of the grinding wheel so that the grinding operation may be continued on the side of the saw blade opposite to that upon which the first grinding operations were performed. This sharpens the saw blade to an upper sharp edge for cutting paper, cardboard, leather or other suitable materials.

While a band saw has been referred to it should be kept in mind that a straight saw blade may be sharpened as desired, and that the cross-sectional contour of the grinding wheel may be of any shape desired for the particular shape of teeth being ground. While sharpening saw teeth has been referred to, it should be remembered that new teeth may be cut in a saw blade blank as well as sharpening teeth already formed therein as desired. This eliminates the tedious and time consuming hand operations heretofore employed in sharpening or forming teeth in such saws, all that is necessary being to insert the saw blade, with the proper adjustments having been made in the machine, then start the machine and it will automatically sharpen or form the teeth throughout the entire length of the saw blade first on one side, and then when the saw blade has been manually reversed end for end and the machine again started it will duplicate the grinding operation upon the other side of the saw blade.

Having described my invention, I claim:

1. In saw grinding apparatus, in combination, a grinding wheel adapted to grind teeth in a saw blade, means for rotating said wheel, means for alternately moving said wheel against the saw blade and move it away therefrom, means adapted to mount a saw blade opposite the wheel for intermittent sliding movement therepast, a reciprocal carriage having spaced parts forming a guiding groove for slidably receiving the saw blade, a pair of gripping jaws on said carriage for moving idly along the blade when the carriage is moved in one direction and constructed for gripping and moving the blade when the carriage is moved in the opposite direction, said carriage having a pair of spaced stops forming a slot to slidably receive the saw blade, said slot and the space between the gripping jaws being in longitudinal alinement.

2. Saw grinding apparatus as claimed in claim 1, in which one of said jaws is stationary with relation to the carriage with an end touching one side face of the blade, and the other jaw is swingable with relation to the carriage and has a beveled end with its apex touching the other side face of the blade at a more advanced position than a line perpendicular to the saw blade which passes through the center of rotation of the swingable jaw, said jaws being in the form of pins on opposite sides of the saw blade.

3. In saw cutting apparatus in combination, a frame, a cutting element swingably mounted on said frame and adapted to cut teeth in a saw blade, means for moving said cutting element away from the saw blade after each cutting operation, a longitudinal track member, a reciprocable member slidably mounted on said track member, a saw blade receiving carriage mounted to move with said reciprocable member, and jaw members in said carriage constructed to idly pass longitudinally along the saw blade when the carriage moves in one direction and to grip the saw and move it a tooth distance when the carriage moves in the opposite direction, said jaw members comprising a pin fixed to the carriage on one side of the blade and a pin swingably mounted on the carriage on the other side of the blade.

4. In saw cutting apparatus in combination, a frame, a cutting element swingably mounted on said frame and adapted to cut teeth in a saw blade, means for moving said cutting element away from the saw blade after each cutting operation, a track member, a cross head slidably mounted on said track member, a saw moving carriage fixed to move with the cross head and having portions forming alined saw blade receiving spaces, a stationary pin in said carriage with one end adapted to touch a side face of the blade, a swingable pin in said carriage on the other side of the blade position, said swingable pin being so arranged that when the carriage moves in one direction the two pins are adapted to idly move along the blade and when the carriage is moved in the opposite direction the blade will be gripped between the pin ends and moved with the carriage to move the blade for cutting another tooth.

5. Saw cutting apparatus as claimed in claim 4, in which said swingable pin is formed at the saw blade contacting end with an inclined end forming an acute angle at its leading edge with relation to saw movement which leading edge is adapted to contact a saw blade face and the rest of the inclined end be free of the blade face, said pins being mounted on rods on opposite sides of the saw blade.

6. Saw cutting apparatus as claimed in claim 5, having means for resiliently urging said leading edge of the swingable pin to a saw-blade-face-engaging position to maintain said position at all times that a saw blade is in the carriage.

7. Saw cutting apparatus as claimed in claim 6, in which said leading edge is when in use always ahead of the longitudinal axis of the stationary pin.

8. In saw grinding apparatus, a carriage for intermittently moving a saw blade longitudinally in one direction, said carriage comprising a plate member, a pair of block members laterally spaced apart a distance to receive a saw blade for longitudinal sliding movement therebetween, said pair of block members being positioned adjacent one end of the plate member, means for adjusting one of said block members to vary the space therebetween, a pair of spaced projections adjacent the opposite end of the plate member and having the space between said projections in alinement with the space between said block members, means on said plate member for gripping and moving a saw blade in one direction and releasing it in the opposite direction, and means for reciprocating said carriage.

9. Saw grinding apparatus as claimed in claim 8, in which saw blade gripping and moving means includes a fixed projection on one side of the saw blade path and a swingable projection on the other side, said fixed projection and said swingable projection each being in the form of a pin the end of which engages a side face of the saw blade.

10. Saw grinding apparatus as claimed in claim 9, in which said swingable projection is formed on its blade engaging end with a hardened biting edge which when it engages the adjacent face of a blade is always ahead of dead center with relation to the direction of movement of the blade, the longitudinal axis of the swingable pin being at a slight angle to the longitudinal axis of the fixed pin.

11. Saw grinding apparatus as claimed in claim 10, in which said blade engaging end of the swingable projection is inclined rearwardly from said biting edge so that the biting edge is the only part that engages the adjacent blade face, said biting edge being on the forward edge of the swingable projection with relation to the direction of saw blade feed.

12. Saw grinding apparatus as claimed in claim 8, in which said pair of block members and said pair of spaced projections are respectively adjustable to accommodate saw blades of different thickness, said means for gripping the saw blade having a space in longitudinal alinement with the spaces between the block members and the first mentioned spaced projections.

13. Saw grinding apparatus as claimed in claim 8, in which the saw blade gripping and moving means includes a fixed projection on one side of the saw blade path and a swingable projection on the other side, said fixed projection and said swingable projection each being in the form of a pin the end of which engages a side face of the saw blade, said fixed projection pin of the blade gripping means comprising a flat end adjacent the saw path which path is parallel to said flat end, and the swingable projection pin being mounted in an oscillatable shaft, said last mentioned pin having a biting edge at its leading edge and the rest of this pin end receding away from the saw blade path.

14. Saw grinding apparatus as claimed in claim 13, including means for resiliently urging said biting edge toward the saw blade path.

15. In saw grinding apparatus, a frame having an elongated track bar extending longitudinally and stationarily therealong, a grinding wheel rotatably and swingably mounted on said frame and adapted to cut teeth in a saw blade, means for moving said wheel away from the saw blade after each cutting operation, a laterally extending arm fixed to said track bar, a saw guiding head adjustably mounted on said arm, gage blocks in said head, a cross head slidably mounted on said track bar and having an extension member fixed thereto, a carriage fixed to said extension to move with the cross head, said carriage having spaced guiding blocks to receive a saw blade in sliding relation, a stationary pin in said carriage to contact one side face of the blade, a swingable pin in the carriage to contact the other blade face, said swingable pin being so arranged that when the carriage moves in one direction the two pins idly move along the blade and when the carriage moves in the opposite direction the blade will be gripped between the adjacent pin ends for movement of the blade a distance for cutting another tooth, a rotatable crank disk on said frame and having a crank pin, a lever pivotally mounted on the frame, a connecting rod connecting said crank pin and said lever, and means connecting one end of the lever with the cross head for movement thereof from the crank pin.

16. Saw grinding apparatus as claimed in claim 15, including means for adjusting the amount of movement of said cross head selectively as desired to accommodate saws having different distances between teeth.

17. In saw grinding apparatus, a frame, a cutting element swingably mounted on said frame and adapted to cut teeth in a saw blade, means for moving said cutting element away from the saw blade after each cutting operation, a cross head slidably mounted on said frame, a saw moving carriage fixed to move with the cross head, a pair of rods in said carriage extending upwardly therefrom one on each side of the saw blade path, one of said rods being fixed to the carriage and the other rod being rotatable in the carriage, a laterally extending pin adjustably fixed in the fixed rod so that one of its ends will contact one of the side faces of the blade, a laterally extending pin adjustably fixed in the rotatable rod and having its inner end beveled to a sharp edge to contact the other side face of the blade, the longitudinal axis of the beveled pin being positioned at a slight angle with relation to the longitudinal axis of the other pin with said sharp edge in advance of said axis of the first mentioned pin to grip the blade and move it for cutting another tooth, said pins moving idly along the blade when the carriage is moved in the opposite direction.

18. Saw grinding apparatus as claimed in claim 17, including spring means connected to the rotatable rod and the fixed rod to resiliently urge said sharp edge toward the adjacent side face of the blade during operation of the apparatus.

JOHN J. WIEGAND.

REFERENCES CITED

The following references are of record in the file of this patent:

UNITED STATES PATENTS

| Number | Name | Date |
|---|---|---|
| 344,777 | Griswold | June 29, 1886 |
| 365,337 | Gould | June 21, 1887 |
| 723,400 | MacKenzie | Mar. 24, 1903 |
| 1,080,359 | Mattison | Dec. 2, 1913 |
| 1,452,351 | Armstrong et al. | Apr. 17, 1923 |
| 1,526,050 | Carmichael | Feb. 10, 1925 |
| 2,380,736 | Eden | July 31, 1945 |